United States Patent
Chang et al.

(10) Patent No.: US 8,913,252 B2
(45) Date of Patent: Dec. 16, 2014

(54) COMPUTING DEVICE AND MEASUREMENT CONTROL METHOD

(71) Applicants: Hong Fu Jin Precision Industry (ShenZhen) Co., Ltd., Shenzhen (CN); Hon Hai Precision Industry Co., Ltd., New Taipei (TW)

(72) Inventors: Chih-Kuang Chang, New Taipei (TW); Li Jiang, Shenzhen (CN); Zhong-Kui Yuan, Shenzhen (CN); Wei-Wen Wu, Shenzhen (CN); Xiao-Guang Xue, Shenzhen (CN); Jian-Hua Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/132,923

(22) Filed: Dec. 18, 2013

(65) Prior Publication Data
US 2014/0240718 A1    Aug. 28, 2014

(30) Foreign Application Priority Data
Feb. 28, 2013   (CN) .......................... 2013 1 00662854

(51) Int. Cl.
*G01B 11/14*     (2006.01)

(52) U.S. Cl.
CPC ...................................... *G01B 11/14* (2013.01)
USPC ............................ 356/614; 702/151; 438/146

(58) Field of Classification Search
CPC ........................................................ G01B 11/14
USPC .......... 356/610–625, 512; 702/150, 151, 105; 250/208.1, 559.08, 559.29; 438/146, 438/142
See application file for complete search history.

(56) References Cited

U.S. PATENT DOCUMENTS

| | | | |
|---|---|---|---|
| 6,211,506 B1* | 4/2001 | Pryor et al. ................. | 250/208.1 |
| 7,876,927 B2* | 1/2011 | Han et al. ...................... | 382/104 |
| 2004/0193385 A1* | 9/2004 | Yutkowitz ..................... | 702/151 |
| 2010/0017870 A1* | 1/2010 | Kargupta ......................... | 726/14 |
| 2012/0072170 A1* | 3/2012 | McKendrick et al. ........ | 702/150 |
| 2012/0229814 A1* | 9/2012 | Freimann et al. ............. | 356/512 |
| 2014/0002610 A1* | 1/2014 | Xi et al. ......................... | 348/46 |

* cited by examiner

*Primary Examiner* — Sang Nguyen
(74) *Attorney, Agent, or Firm* — Novak Druce Connolly Bove + Quigg LLP

(57) ABSTRACT

A computing device is electronically connected to a measurement machine and a controller. The controller is connected to a sensor installed on the measurement machine. The computing device receives spectral signal data sent from the controller and generates an intensity distribution diagram according to the spectral signal data. Furthermore, the computing device sends control commands to the measurement machine, to adjust a position of the sensor on the measurement machine according to variation of a peak value of a wave in the intensity distribution diagram.

19 Claims, 5 Drawing Sheets

COMPUTING DEVICE AND MEASUREMENT CONTROL METHOD

BACKGROUND

1. Technical Field

Embodiments of the present disclosure relate to device controlling systems and methods, and more particularly to an electronic device and a method for adjusting volume levels of an audio signal output by the electronic device.

2. Description of Related Art

In measurement field, a spectral confocal sensor may be installed on a measurement machine to measure special products (e.g., glass products). To position a measurement point on an object, a user has to observe a position relationship between the spectral confocal sensor and a light spot projected on the object by the spectral confocal sensor, and manually adjust a position of the spectral confocal sensor according to the observed result. Because the light spot projected on the object by the spectral confocal sensor is very small, it's time-consuming and difficult to precisely position the measurement point using one's eyes.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
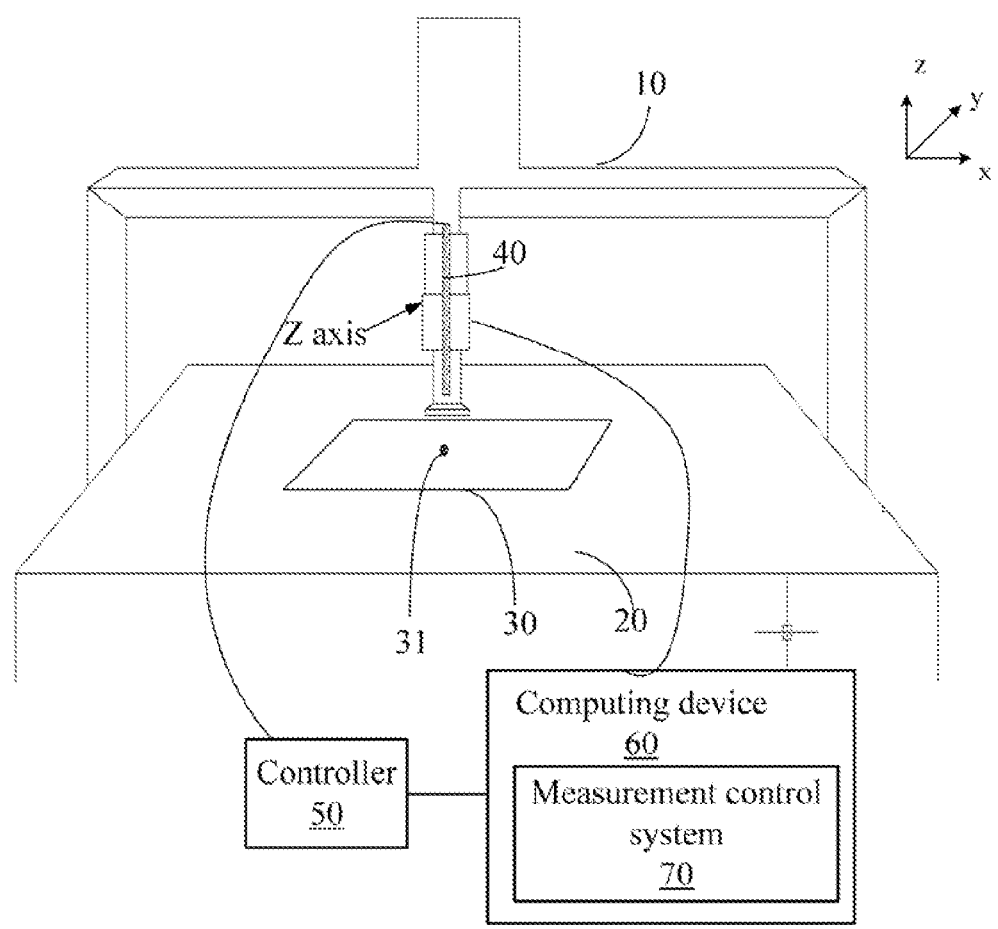
FIG. 1 is a schematic diagram of one embodiment of a computing device including a measurement control system.

FIG. 1 is a block diagram of one embodiment of a computing device 60. The computing device 60, which includes a measurement control system 70, is electronically connected to a measurement machine 10 and a controller 50. The controller 50 is connected to a sensor (such as a spectral confocal sensor) 40 installed on a Z axis of the measurement machine 10. In this embodiment, an optical fiber cable connects the controller 50 with the sensor 40. An object 30 is located on a work table 20 of the measurement machine 10. The measurement machine 10 further includes an X axis and a Y axis, where the X axis and the Y axis form a XY plane that is parallel to a surface of the work table 20. The XY plane and the Z axis form a machine coordinate system as shown in FIG. 1

Figure 2:
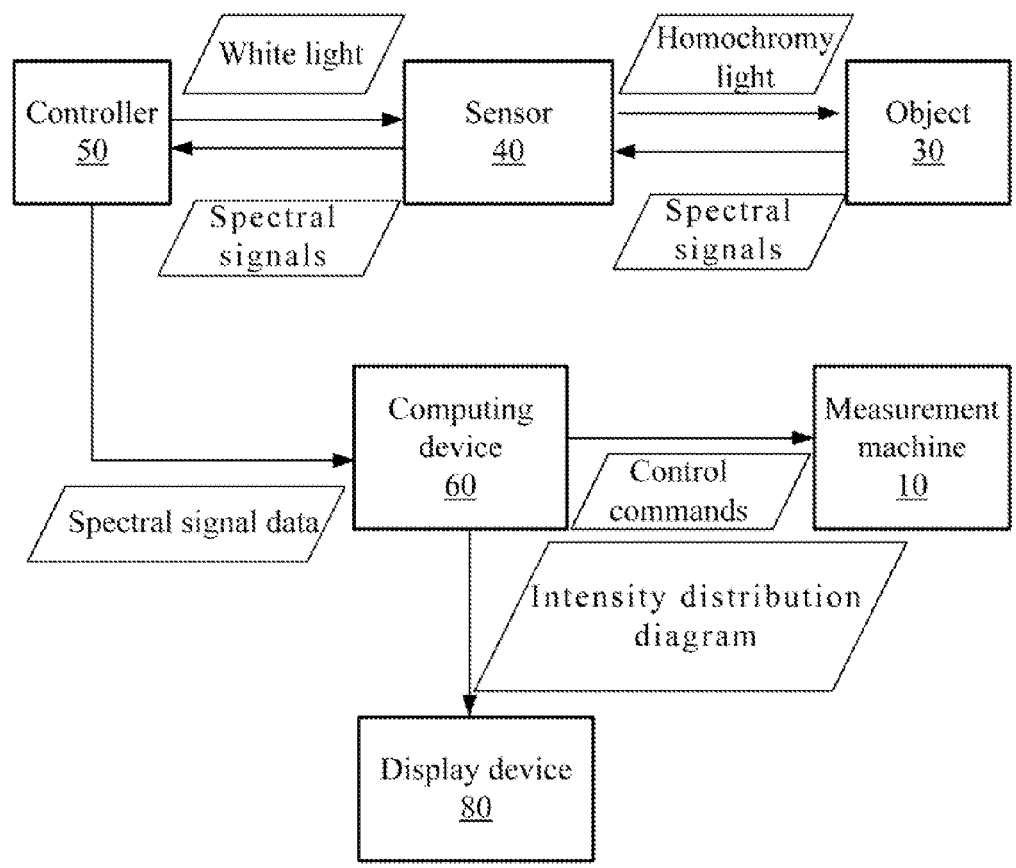
FIG. 2 is a block diagram of one embodiment illustrating a work principle of the measurement control system of FIG. 1.

The controller 50 includes one or more light sources, a spectral analysis circuit, a light source control circuit, and input/output ports. The controller 50 emits a beam of white light and transmits the white light to the sensor 40. The sensor 40 includes a plurality of optimal lenses. FIG. 2 is a block diagram of one embodiment illustrating a work principle of the measurement control system of FIG. 1. The white light emitter from the controller 50 passes through the plurality of optimal lenses and is separated into a plurality of homochromy lights (such as red lights, green lights) with different wavelengths. Then the homochromy lights are projected onto a measurement point on the object 30. The human eyes see the homochromy lights as a light spot. The sensor 40 receives spectral signals reflected from the object 30, and transmits the spectral signals to the controller 50. The controller 50 analyzes the spectral signals to obtain data in relation to the spectral signals (hereinafter "spectral signal data"), and transmits the spectral signal data to the computing device 60.

Figure 4A:
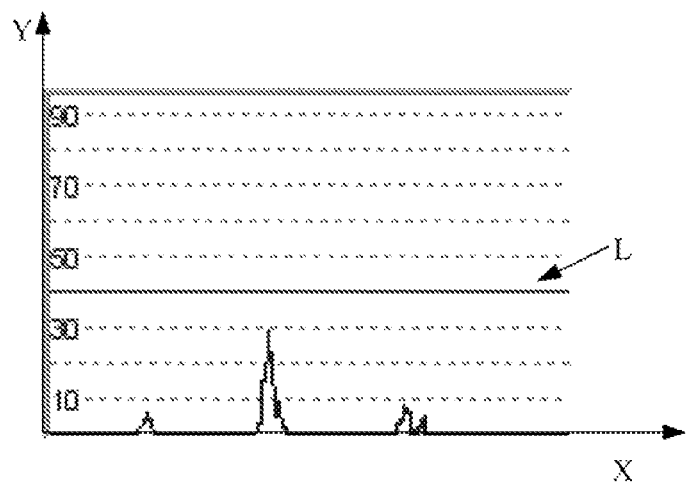
FIG. 4A-FIG. 4C are one embodiment illustrating an intensity distribution diagram of spectral signals.
Figure 4B:
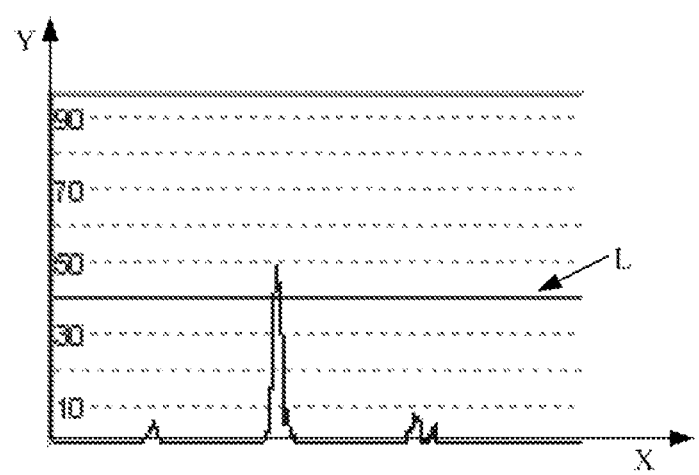
Figure 4C:
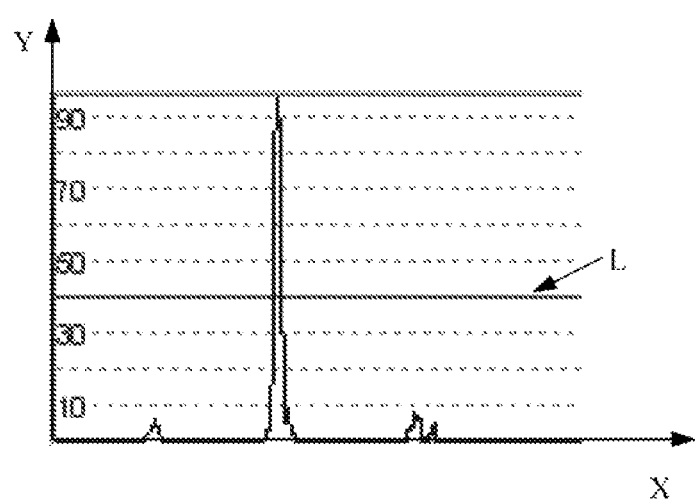

The computing device 60 receives the spectral signal data. The measurement control system 70 analyzes the spectral signal data, and generates an intensity distribution diagram (as shown in FIG. 4A-FIG. 4C). Furthermore, the measurement control system 70 sends control commands to the measurement machine 10, adjusts a position of the sensor 40 on the Z axis of the measurement machine 10 according to variation of a peak value of a wave in the intensity distribution diagram, to adjust the measurement point to fall within an effective detection range of the sensor 40. The measurement control system 70 may further display the intensity distribution diagram on a display device 80 that is electronically connected to the computing device 60.

Figure 3:
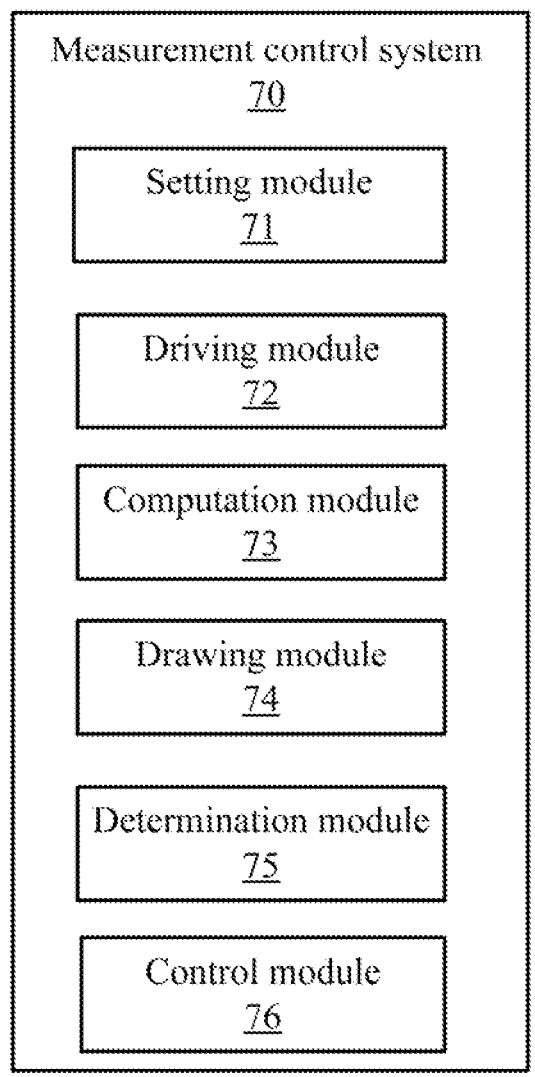
FIG. 3 is a block diagram of one embodiment of function modules of the measurement control system of FIG. 1.

As shown in FIG. 3, the measurement control system 70 includes a setting module 71, a driving module 72, a computation module 73, a drawing module 74, a determination module 75, and a control module 76. The modules 71-76 include computerized code in the form of one or more programs, which are stored in a storage device (not shown) of the computing device 60. A processor (not shown) of the computing device 60 executes the computerized code, to provide the aforementioned function of the measurement control system 70. A detailed description of functions of the modules 71-76 is given in reference to FIG. 5.

Figure 5:
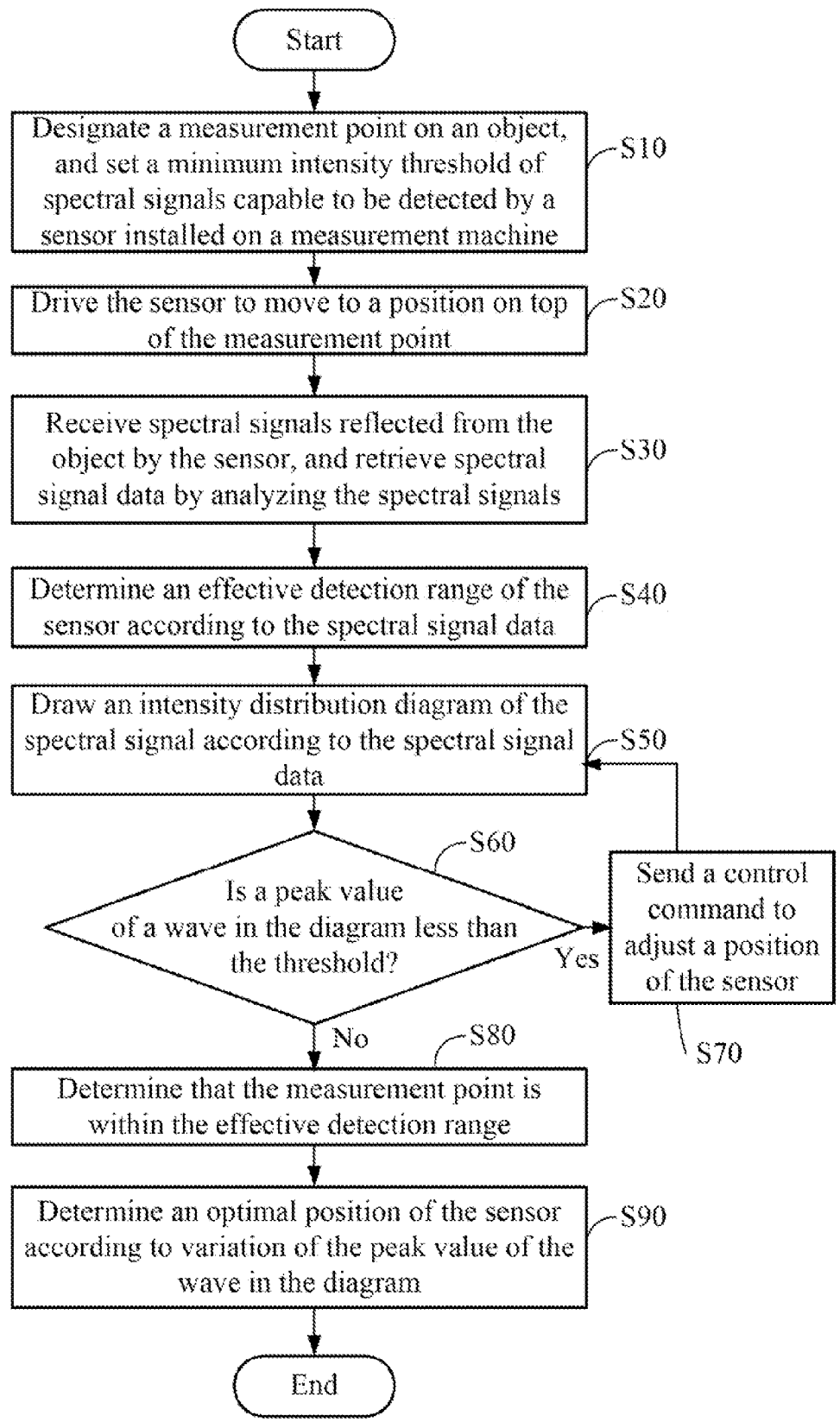
FIG. 5 is a flowchart of one embodiment of a measurement control method.

FIG. 5 is a block diagram of one embodiment of a measurement control method. Depending on the embodiment, additional steps may be added, others removed, and the ordering of the steps may be changed.

Step S10, the setting module 71 designates a measurement point on the object 30. For example, the setting module 71 receives coordinate data of the measurement point in a machine coordinate system, where the coordinate data is inputted by a user via a user interface. The setting module 71 sets an intensity threshold of spectral signals capable of being detected by the sensor 40 installed on the Z axis of the measurement machine 10. For example, a minimum intensity value of the spectral signals capable of being detected by the sensor 40 may be set as 40 candelas (cds). As shown in FIG. 4A-FIG. 4C, a line L indicates the minimum intensity value of the spectral signals is set as 40 cds. In other embodiment, the intensity threshold may further include a maximum intensity value of the spectral signals capable of being detected by the sensor 40.

In step S20, the driving module 72 generates a driving command according to the coordinate data of the measurement point, and sends the driving command to the measurement machine 10, to drive the sensor 40 to move to a position on top of the measurement point of the object 30.

In step S30, the controller 50 emits a beam of white light, and transmits the white light to the sensor 40. The sensor 40 separates the white light into a plurality of homochromy lights (such as red light, green light) with different wavelengths, projects the homochromy lights onto the measurement point on the object 30, and receives spectral signals reflected from the object, and sends the spectral signals back to the controller 50. The controller 50 analyzes the spectral signals to obtain spectral signal data, and sends the spectral signal data to the computing device 60. The spectral signal data includes a wavelength and an intensity value of each spectral signal.

In step S40, the computation module 73 determines an effective detection range of the sensor 40 according to the spectral signal data. In one embodiment, the effective detection range is determined as a wavelength range determined according to a maximum wavelength of the spectral signals and a minimum wavelength of the spectral signals. For example, if the maximum wavelength of the spectral signal is w1, and the minimum wavelength of the spectral signals is w2, then the effective detection range is determined as between "0" and "w2-w1".

In step S50, the drawing module 74 draws an intensity distribution diagram according to the spectral signal data, and displays the intensity distribution diagram on the display device 80. For example, the intensity distribution diagrams in FIG. 4A-FIG. 4C are drawn according to different spectral signal data which are obtained when the sensor 40 is located on different positions on the Z axis of the measurement machine 10. In FIG. 4A-FIG. 4C, an X axis represents a wavelength of each spectral signal, and a Y axis represents an intensity value of each spectral signal.

In step S60, the determination module 75 determines if the measurement point falls within the effective detection range of the sensor 40 by determining if a peak value of a wave in the intensity distribution diagram is less than the intensity threshold. If the peak value of the wave in the intensity distribution diagram is less than the intensity threshold (as shown in FIG. 4A), the determination module 75 determines that the measurement point falls outside the effective detection range of the sensor 40, and step S70 is implemented. In step S70, the control module 76 sends a control command to the measurement machine 10, to adjust the position of the sensor 40 on the Z axis of the measurement machine 10. Then the procedure returns to step S50.

In step S60, if the peak value of the wave in the intensity distribution diagram is equal to or more than the intensity threshold (as shown in FIG. 4B), step S80 is implemented. In step S80, the determination module 75 determines that the measurement point falls within the effective detection range of the sensor 40.

In step S90, the control module 76 sends an adjustment command to the measurement machine 10, to control the sensor 40 to move on the Z axis of the measurement machine 10. During the movement of the sensor 40 on the Z axis of the measurement machine 10, the determination module 75 determines an optimal position of the sensor 40 according to variation of the peak value of the wave in the intensity distribution diagram. For example, when the sensor 40 moves downwards along the Z axis of the measurement machine 10, the peak value of the wave increases and reaches a maximum value as shown in FIG. 4C. In such a situation, when the sensor 40 further moves downwards along the Z axis of the measurement machine 10, the peak value of the wave begins to decrease. Then the position of the sensor 40, which results in the peak value of the wave reaching the maximum value as shown in FIG. 4C, is determined as the optimal position of the sensor 40.

The method may further include steps, which output measurement data, such as position data of the sensor 40, peak values of the wave in the intensity distribution diagram, on the display device 80.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A measurement control method being executed by a processor of a computing device, the computing device being electronically connected to a controller and a measurement machine having an X axis, a Y axis, and a Z axis, the controller being electronically connected to a sensor installed on the Z axis of the measurement machine, the method comprising:
   receiving coordinate data of a measurement point on an object and a minimum intensity threshold of spectral signals capable of being detected by the sensor set by a user;
   generating a driving command according to the coordinate data of the measurement point, and sending the driving command to the measurement machine, to drive the sensor to move to a position on top of the measurement point on the object;
   receiving spectral signal data sent from the controller, which is retrieved from the spectral signals reflected from the object by the controller;
   determining an effective detection range of the sensor according to the spectral signal data;
   drawing an intensity distribution diagram according to the spectral signal data;
   determining whether a peak value of a wave in the intensity distribution diagram is less than the minimum intensity threshold; and
   determining that the measurement point falls outside the effective detection range of the sensor in response to determining the peak value of the wave in the intensity distribution diagram is less than the minimum intensity threshold, and sending a control command to the measurement machine, to adjust the position of the sensor on the Z axis of the measurement machine.

2. The method as claimed in claim 1, further comprising:
   sending an adjustment command to the measurement machine, to control the sensor to move on the Z axis of the measurement machine, and determining an optimal position of the sensor on the Z axis of the measurement machine according to variation of the peak value of the wave in the intensity distribution diagram during the movement of the sensor.

3. The method as claimed in claim 1, wherein:
   the controller emits a beam of white light and transmits the white light to the sensor; and
   the sensor separates the white light into a plurality of homochromy lights, projects the homochromy lights onto the object, receives spectral signals reflected from the object, and sends the spectral signals to the controller.

4. The method as claimed in claim 1, wherein the spectral signal data comprises a wavelength and an intensity value of each spectral signal.

5. The method as claimed in claim 1, wherein the effective detection range is a wavelength range determined according to a maximum wavelength of the spectral signals and a minimum wavelength of the spectral signals.

6. The method as claimed in claim 1, further comprising:
displaying the intensity distribution diagram on a display device.

7. The method as claimed in claim 1, further comprising:
outputting position data of the sensor and the peak value of the wave in the intensity distribution diagram on a display device during the movement of the sensor.

8. A computing device being electronically connected to connected to a controller and a measurement machine having an X axis, a Y axis, and a Z axis, the controller being electronically connected to a sensor installed on the Z axis of the measurement machine, the computing device comprising:
a processor; and
a storage device that stores one or more programs, when executed by the processor, causing the processor to perform operations of:
receiving coordinate data of a measurement point on an object and a minimum intensity threshold of spectral signals capable of being detected by the sensor set by a user;
generating a driving command according to the coordinate data of the measurement point, and sending the driving command to the measurement machine, to drive the sensor to move to a position on top of the measurement point on the object;
receiving spectral signal data sent from the controller, which is retrieved from the spectral signals reflected from the object by the controller;
determining an effective detection range of the sensor according to the spectral signal data;
drawing an intensity distribution diagram according to the spectral signal data;
determining whether a peak value of a wave in the intensity distribution diagram is less than the minimum intensity threshold; and
determining that the measurement point falls outside the effective detection range of the sensor in response to determining the peak value of the wave in the intensity distribution diagram is less than the minimum intensity threshold, and sending a control command to the measurement machine, to adjust the position of the sensor on the Z axis of the measurement machine.

9. The computing device as claimed in claim 8, wherein the operations further comprise:
sending an adjustment command to the measurement machine, to control the sensor to move on the Z axis of the measurement machine, and determining an optimal position of the sensor according to variation of the peak value of the wave in the intensity distribution diagram during the movement of the sensor.

10. The computing device as claimed in claim 8, wherein:
the controller emits a beam of white light and transmits the white light to the sensor; and
the sensor separates the white light into a plurality of homochromy lights, projects the homochromy lights onto the object, receives spectral signals reflected from the object, and sends the spectral signals to the controller.

11. The computing device as claimed in claim 8, wherein the spectral signal data comprises a wavelength and an intensity value of each spectral signal.

12. The computing device as claimed in claim 8, wherein the effective detection range is a wavelength range determined according to a maximum wavelength of the spectral signals and a minimum wavelength of the spectral signals.

13. The computing device as claimed in claim 8, wherein the operations further comprise:
outputting position data of the sensor and the peak value of the wave in the intensity distribution diagram on a display device during the movement of the sensor.

14. A non-transitory computer-readable storage medium having stored thereon instructions that causes a processor of a computing device to perform operations of:
receiving coordinate data of a measurement point on an object and a minimum intensity threshold of spectral signals capable of being detected by the sensor set by a user;
generating a driving command according to the coordinate data of the measurement point, and sending the driving command to the measurement machine, to drive the sensor to move to a position on top of the measurement point on the object;
receiving spectral signal data sent from the controller, which is retrieved from the spectral signals reflected from the object by the controller;
determining an effective detection range of the sensor according to the spectral signal data;
drawing an intensity distribution diagram according to the spectral signal data;
determining whether a peak value of a wave in the intensity distribution diagram is less than the minimum intensity threshold; and
determining that the measurement point falls outside the effective detection range of the sensor in response to determining the peak value of the wave in the intensity distribution diagram is less than the minimum intensity threshold, and sending a control command to the measurement machine, to adjust the position of the sensor on the Z axis of the measurement machine.

15. The non-transitory computer-readable storage medium as claimed in claim 14, wherein the operations further comprise:
sending an adjustment command to the measurement machine, to control the sensor to move on the Z axis of the measurement machine, and determining an optimal position of the sensor according to variation of the peak value of the wave in the intensity distribution diagram during the movement of the sensor.

16. The non-transitory computer-readable storage medium as claimed in claim 14, wherein:
the controller emits a beam of white light and transmits the white light to the sensor; and
the sensor separates the white light into a plurality of homochromy lights, projects the homochromy lights onto the object, receives spectral signals reflected from the object, and sends the spectral signals to the controller.

17. The non-transitory computer-readable storage medium as claimed in claim 14, wherein the spectral signal data comprises a wavelength and an intensity value of each spectral signal.

18. The non-transitory computer-readable storage medium as claimed in claim 14, wherein the effective detection range is a wavelength range determined according to a maximum wavelength of the spectral signals and a minimum wavelength of the spectral signals.

19. The non-transitory computer-readable storage medium as claimed in claim 14, wherein the operations further comprise: outputting position data of the sensor and the peak value of the wave in the intensity distribution diagram on a display device during the movement of the sensor.

\* \* \* \* \*